United States Patent
Herbst et al.

(10) Patent No.: US 6,857,217 B1
(45) Date of Patent: Feb. 22, 2005

(54) FISHING GAFF WITH MULTI-POSITION FISH HOOK

(75) Inventors: Richard Herbst, Sarasota, FL (US); Robert Brady, Sarasota, FL (US); Dale Walker, Palm Harbor, FL (US)

(73) Assignee: Role Associates, LLC, Sarasota, FL (US)

( * ) Notice: Subject to any disclaimer, the term of this patent is extended or adjusted under 35 U.S.C. 154(b) by 0 days.

(21) Appl. No.: 10/751,358

(22) Filed: Jan. 5, 2004

(51) Int. Cl.[7] ............................................. A01K 97/14
(52) U.S. Cl. ............................... 43/5; 294/19.3; 114/97
(58) Field of Search .............................. 43/5; 294/19.3, 294/26, 66.1; D22/134; 30/297; 114/97

(56) References Cited

U.S. PATENT DOCUMENTS

| | | | | |
|---|---|---|---|---|
| 2,547,273 A | * | 4/1951 | Le Febvre | 294/26 |
| 2,584,371 A | * | 2/1952 | Shackel | 294/104 |
| 2,679,429 A | * | 5/1954 | Martin | 294/26 |
| 3,310,853 A | * | 3/1967 | Winn | 294/3.6 |
| 3,863,377 A | * | 2/1975 | Leonard | 43/6 |
| 3,955,302 A | * | 5/1976 | Tudisco | 43/6 |
| 4,148,512 A | * | 4/1979 | Pendlebury | 294/26 |
| 4,691,465 A | * | 9/1987 | Dooley | 43/5 |
| 4,720,932 A | * | 1/1988 | Bovino | 43/5 |
| 4,734,984 A | * | 4/1988 | Snell et al. | 30/322 |
| 4,739,573 A | * | 4/1988 | Robertson | 43/5 |
| 5,171,052 A | * | 12/1992 | Cunningham | 294/19.1 |
| 6,293,601 B1 | * | 9/2001 | Johnson | 294/26 |

* cited by examiner

*Primary Examiner*—Peter M. Poon
*Assistant Examiner*—Bethany L. Griles
(74) *Attorney, Agent, or Firm*—Charles J. Prescott

(57) ABSTRACT

A hand held fishing gaff for manually engaging and lifting fish from water having a multi-position fish hook. The handle preferably has a straight main portion and a gripping portion which is arcuately shaped and extends away from a longitudinal axis of the straight portion. A fish hook is connected to the handle and is lockably positionable in a plurality of different rotationally aligned positions about the longitudinal axis. A fish hook detent interconnected between the handle and fish hook shank is selectively self-locking into one of a plurality of positional orientations of the fish hook. The device is preferably buoyant in water and the handle preferably has a uniform oval cross section to enhance gripability.

5 Claims, 5 Drawing Sheets

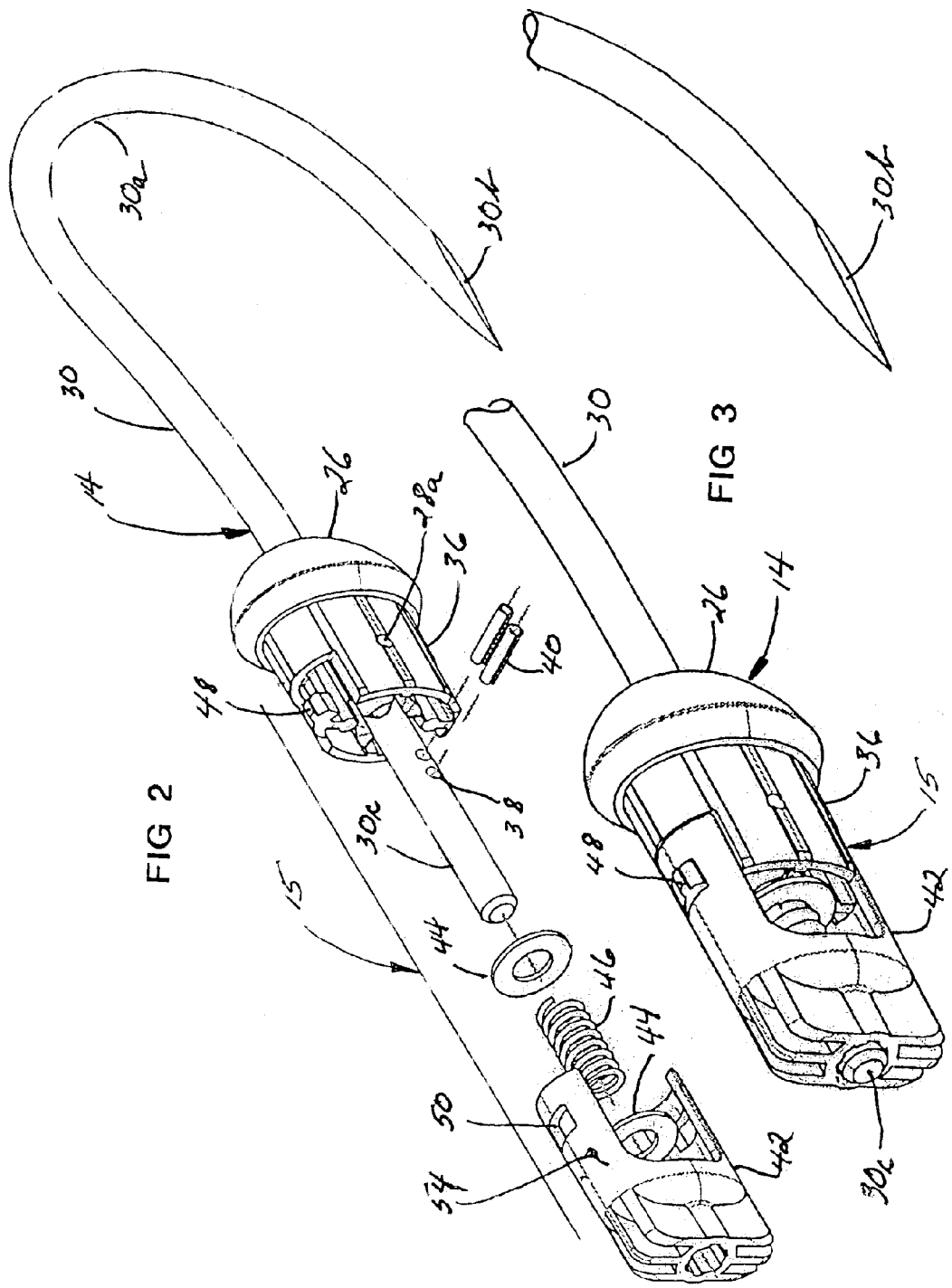

FIG 8
FIG 9
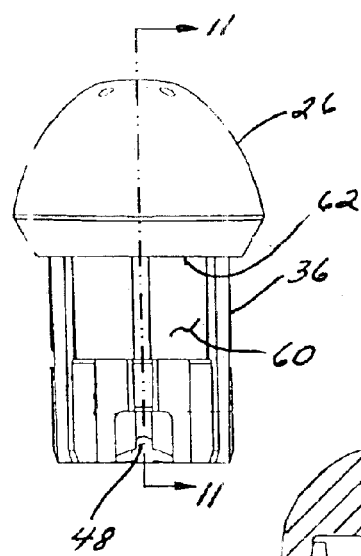
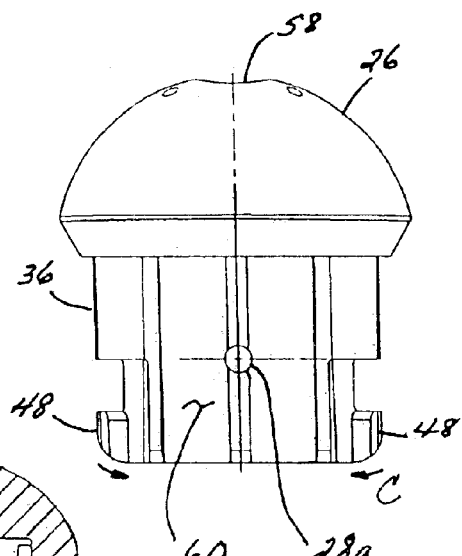
FIG 12
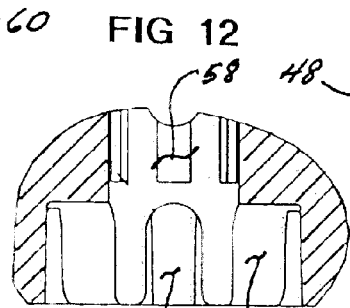
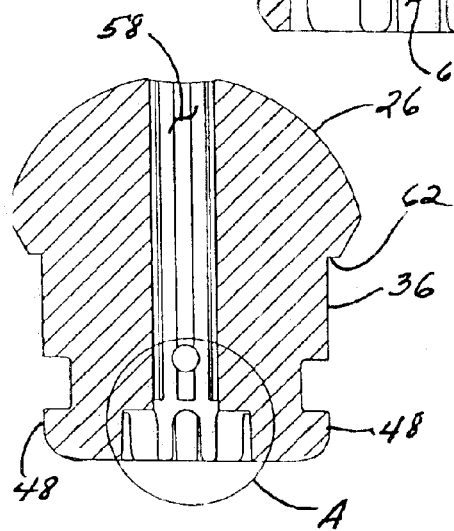
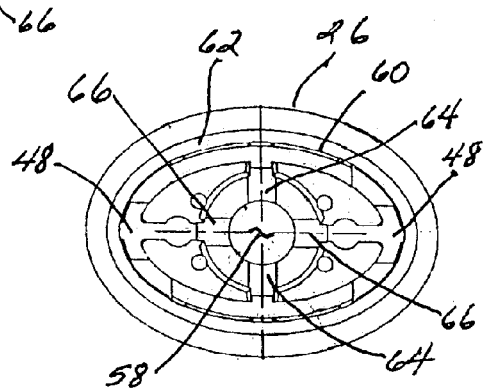
FIG 11
FIG 10

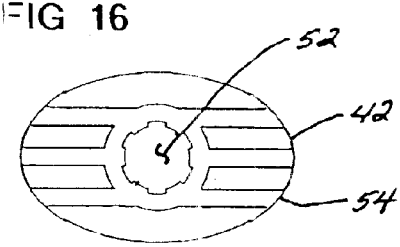
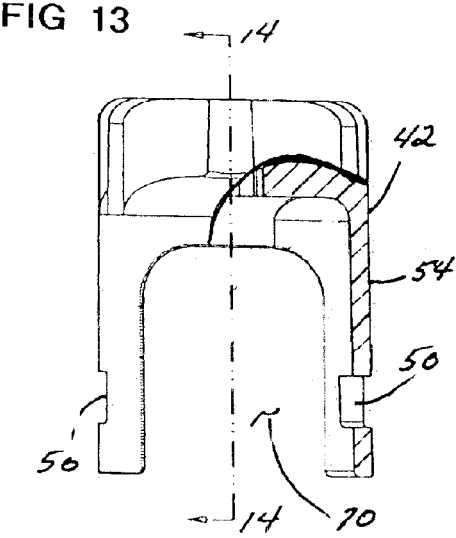
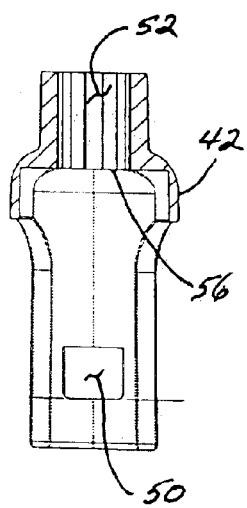
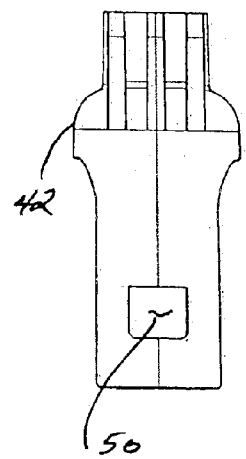
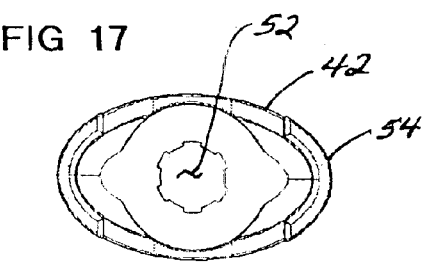

FISHING GAFF WITH MULTI-POSITION FISH HOOK

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to fishing implements and accessories, and more particularly to a hand held fishing gaff having multiple positions of orientation of its fish hook or fish engaging portion.

2. Description of Related Art

Manually held fishing gaffs are well known. Such gaffs include an elongated handle for hand grasping at the hand grasping or gripping end thereof and having a rigid generally U-shaped fish hook extending longitudinally from the opposite or proximal end of the handle. However, such well known fish gaffs typically have an entirely straight handle which limits the ergonomic hand holding utility thereof in that the handle itself may easily twist and rotate within even the firmest hand grasp of a fisherman, thus making it difficult to maintain a desired orientation of the fish hook best suited for each particular situation of use.

The present invention provides two unique structural improvements to such conventional fish gaffs. The first improvement is with respect to the fish hook or fish engaging portion itself. This aspect of the invention provides multiple positional orientations of the fish hook so that the user of the fish hook may quickly selectively orient the direction of alignment of the fish hook to the handle of the gaff. This selective, quickly relockable reorientation of the fish hook itself is particularly beneficial, in combination with an arcuately or offset gripping or grasping portion of the handle as it extends away from the longitudinal axis of the main portion of the handle itself. This offset gripping portion of the handle allows the user to maintain rotational orientation of the handle in keeping with a particular selected orientational position of the fish hook so that the user may maintain the fish hook, for example, in a forwardly, rearwardly or sideward orientation for selected use thereof in gaffing a fish in water under a wide variety of circumstances and preferences.

BRIEF SUMMARY OF THE INVENTION

This invention is directed to a hand held fishing gaff for manually engaging and lifting fish from water having a multi-position fish hook. The fishing gaff includes an elongated handle having a substantially straight main portion and a grasping or gripping portion preferably arcuately shaped and extending away from a longitudinal axis of the straight portion and terminating at a distal end of the handle. A fish engaging member has a substantially straight shank portion and an arcuately shaped hook portion terminating in a sharpened distal tip thereof. The shank portion is connected in substantially colinear alignment within, and extending from the handle proximal end and is lockably positionable in a plurality of different rotationally aligned positions about the longitudinal axis and with respect to said grasping or gripping portion. A fish hook detent interconnected between the straight portion and shank portion and is selectively self-locking into one of a plurality of positional orientations of the fish hook. The handle is hollow and of sufficient interior air volume, in combination with a closed cell foam handle grip cover, to render the fish gaff substantially buoyant in water. The handle preferably has a uniform oval cross section to enhance gripability and a sense of the orientation of the handle when gripped. A detent is spring loaded whereby pushing axially on said fish hook axially moves and releases the fish hook from locking engagement with the detent for rotational repositioning thereof into another one of the plurality of positional orientations, releasing of the fish hook thereafter relocking the fish hook into the detent in the other selected fish hook orientations.

It is therefore an object of this invention to provide a hand held fishing gaff having quickly selectable and relocking multiple positional orientations of the fish hook with respect to the handle.

It is another object of this invention to provide a fishing gaff having a spring loaded detent between the proximal end of the handle and the shank of the fish hook for quick automatic locking engagement of any selected rotational orientation of the fish hook about a longitudinal axis of the handle.

Still another object of this invention is to provide a fish gaff having the unique combination of a multi-positionable fish hook about the longitudinal axis of the handle and an offset, preferably arcuately configured handle gripping portion which allows the user to maintain a desired axial positioning of the handle in combination with one of a plurality of fish hook orientations.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 2 is a perspective exploded view of the fish hook and spring-biased detent arrangement therefor.

FIG. 3 is an assembled perspective view of FIG. 2.

FIG. 8 is an end elevation view of FIG. 7.

FIG. 9 is a side elevation view of FIG. 7.

FIG. 10 is a bottom plan view of FIG. 9.

FIG. 11 is a section view in the direction of arrows 11—11 in FIG. 8.

FIG. 12 is an enlarged view of area A of FIG. 11.

FIG. 13 is a side elevation partially broken view of FIG. 4.

FIG. 14 is a section view in the direction of arrows 14—14 in FIG. 13.

FIG. 15 is an end elevation view of FIG. 13.

FIG. 16 is a top plan view of FIG. 13.

FIG. 17 is a bottom plan view of FIG. 13.

DETAILED DESCRIPTION OF THE INVENTION

Figure 1:
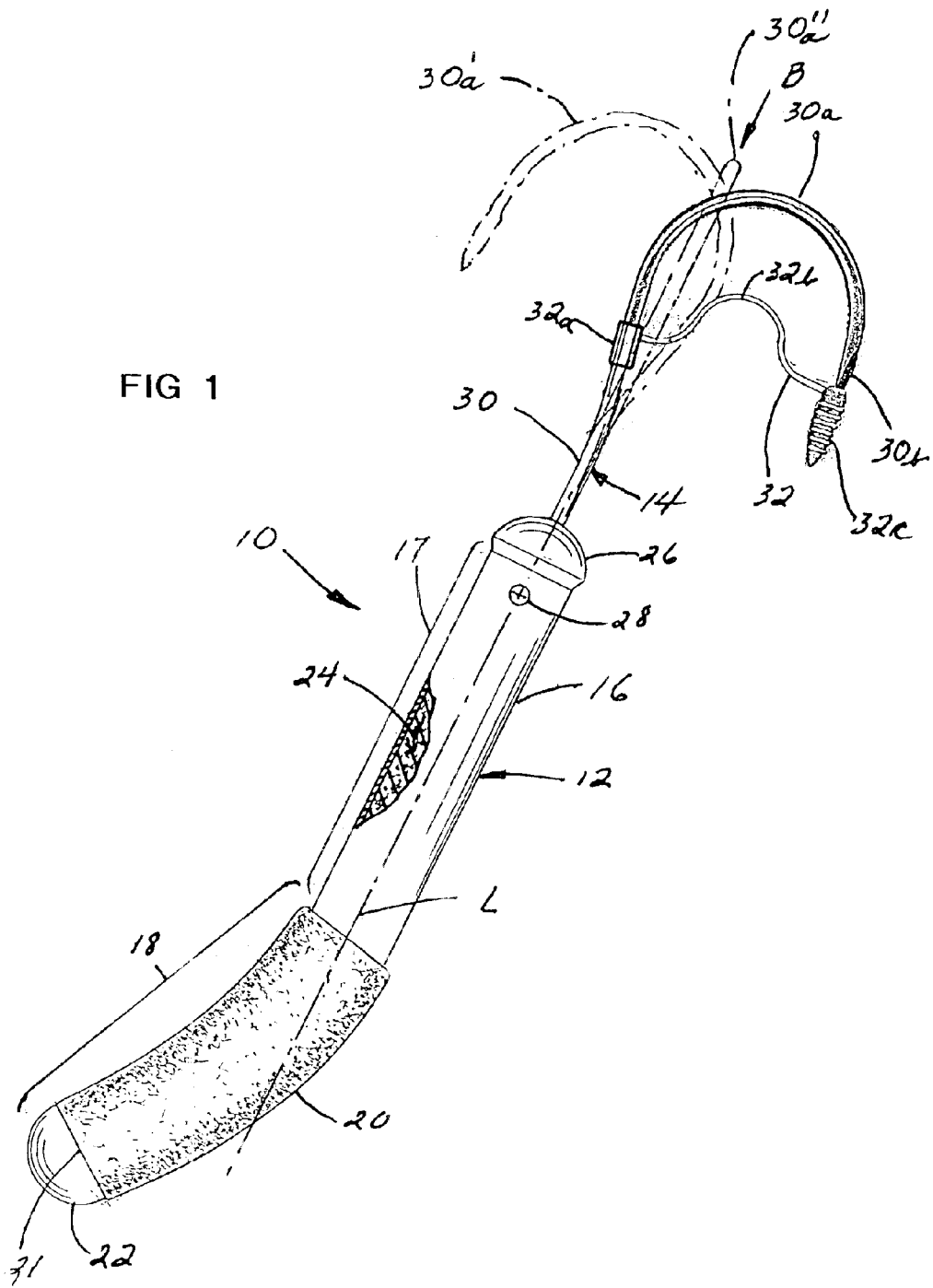
FIG. 1 is a front elevation partially broken view of the invention showing multiple positions of the fish hook in both solid and phantom lines.
Figure 4:
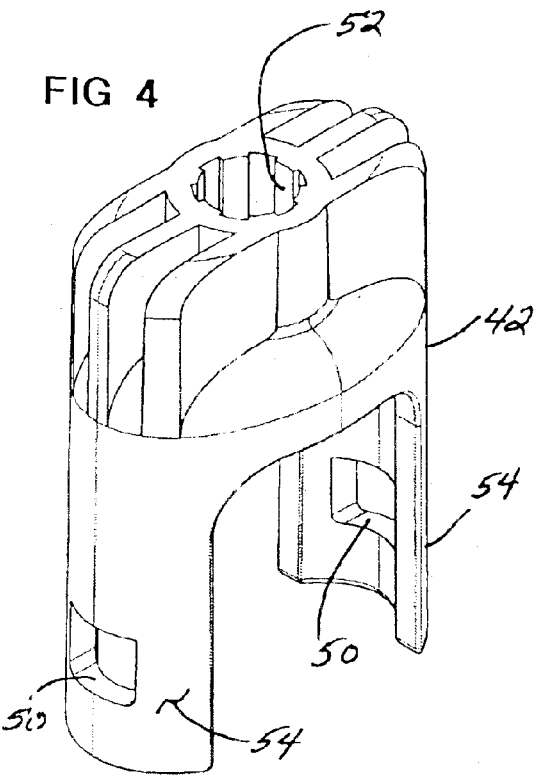
FIG. 4 is a lower perspective view of the spring keeper of the detent assembly of FIG. 2.

Referring now to the drawings the invention is there shown in FIG. 1 generally at numeral 10. This fishing gaff 10 includes an elongated handle assembly 12 and a fish hook assembly 14. The handle 12 is formed of an elongated length of tubular extruded aluminum material having a generally oval cross section as best seen in FIGS. 10, 16 and 17 with respect to the detent assembly 15 which will be described herebelow.

The main or proximal portion 17 of an elongated handle tubular member 16 of handle 12 is generally straight about a longitudinal axis L passing centrally therethrough. The gripping or distal portion 18 of the handle 12 is formed arcuately and extends away from the longitudinal axis L toward the distal end 21 thereof. A tubular foam covering 20 formed of closed cell foam material is provided for both enhanced grippability and additional buoyancy to render the entire fish hook 10 buoyant preferably in combination with the STYRAFOAM 24 which is packed fully within the hollow interior of the handle tubular member 16 to achieve buoyancy in water. A semi-spherical cap 22 provides sealing engagement in water tight fashion into the distal end 21 of the tubular member 16.

The fish hook assembly 14 includes the fish hook 30 formed of cylindrical stainless steel rod and having a substantially straight shank 30c, a U-shaped main hook portion 30a and a distal pointed or sharpened tip 30b. A protective tip cover 32c snuggly and elastically fits over the pointed distal tip 30b and is kept in place by resilient band 32b of a tip guard 32, the tip guard or cover 32 is held in position on the fish hook 30 by a tubular enlargement 32a, the entire tip protector 32 being formed as a unit of resilient elastomeric or plastic material.

The fish hook assembly 14 also includes a detent assembly 15 including a cap member 26 which lockingly engages with a spring keeper 42 as best seen in FIGS. 2 and 3. The cap member 26 has a spherical exposed surface having a central longitudinal aperture 58 formed therethrough as best seen in FIGS. 7 to 12. The longitudinal aperture 58 is sized to snuggly receive the shank 30c. The spring keeper 42 as best seen in FIGS. 4, 5 and 14 to 17 is formed of molded plastic material as is the cap member 26, and includes an oval shaped cylindrical outer surface 54 sized to snuggly be fitted into the inner surface of the tubular handle member 16 as does the cap member 26 at surface 36. The central portion 70 is hollowed to mate around the oval shaped cylindrical surface 36 of the cap member 26.

The cap member 26 and the spring keeper 42 are lockably engaged together by resilient tabs 48 of the cap member 26 which lockably engage into apertures 50 of the spring keeper by deflection in the direction of arrows C in FIG. 9. The assembled together cap member 26 and spring keeper 42 are held in position within the tubular handle member 16 by a conventional flat headed screw 28 threadably engaged into a transverse aperture 28a of the cap member 26.

Figure 5:
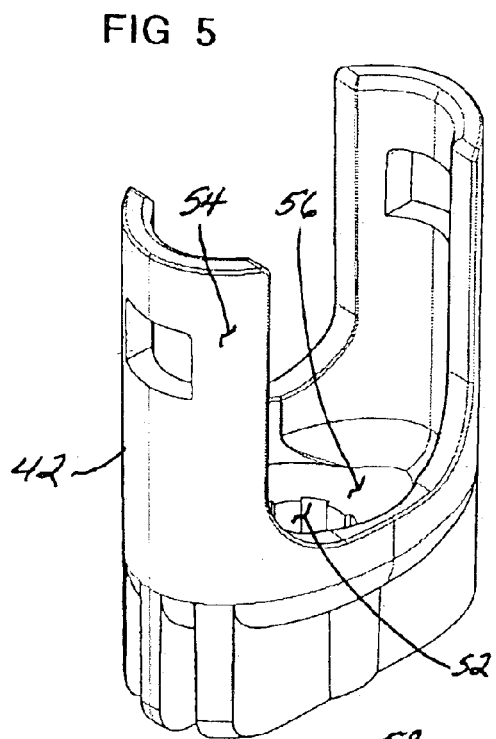
FIG. 5 is an upper perspective view of FIG. 4.
Figure 6:
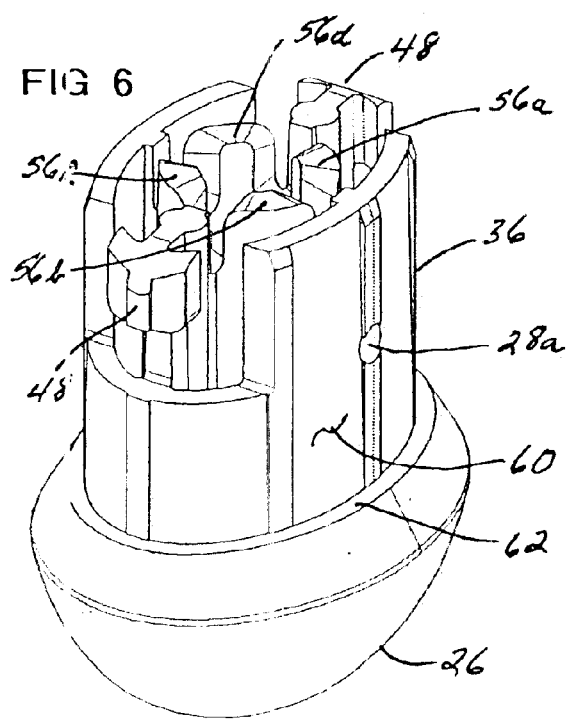
FIG. 6 is a lower perspective view of the shank support cap member of the detent assembly of FIG. 2.
Figure 7:
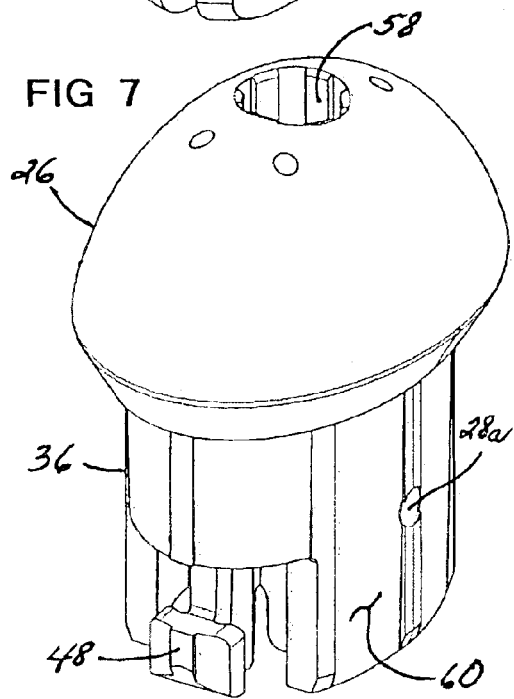
FIG. 7 is an upper perspective view of FIG. 6.

The shank 30c also extends through longitudinal aperture 52 of the spring keeper 42. Again, a very snug slidable engaging fit stabilizes the entire fish hook 30 to permit substantially only rotational and limited longitudinal movement of the shank 30c about and along axis L. A compression spring 46 is positioned between flat washers 44 which are positioned between and against the interior transverse surface 56 of the spring keeper 42 as seen in FIGS. 5 and 14 and against retention pins 40 which are tightly engaged in to transverse apertures 38 formed through the shank 30c. The compression spring 46 as installed in the relaxed position is under compression so as to exert pressure against the washers 44 and to thus cause the locking pins 40 to be biasingly urged into one of two transverse cavities 64 or 66 of the cap member 26 as best seen in FIGS. 10 and 12. The locking pins 40, being longer than the diameter of the shank 30c, will be biasingly engaged into one of these two cavities 64 or 66 so as to retain the selected orientation of the U-shaped main portion 30a of fish hook 30 in one of four orthogonal positions as shown in FIG. 1. Thus, the fish hook 30 may be oriented as shown in solid line with the U-shaped main portion 30a disposed in a plane with the gripping portion 18 of handle 12, but in an opposite direction therefrom. The fish hook 30 may also be positioned orthogonally opposite to that position shown in phantom at 30a' or in either position at 30a" lying orthogonally transverse to a plane passing through the longitudinal axis L of handle 12.

By this arrangement, the user, by grasping the gripping portion 18 and exerting pressure in the direction of arrow B against the U-shaped main portion 30a of fish hook 30, will overcome the spring pressure exerted by spring 46 to compress spring 46 and disengage the locking pins 40 from the currently selected cavity 64 or 66 and allow the fish hook 30 to be rotated about axis L into another desired orientation and then released for relocking engagement of the locking pins 40 into another of the selected locking cavities 64 or 66.

This selective positioning of the fish hook 30, in combination with the offset arcuate structure of the gripping portion 18 of handle 12, permits a broad range of selected variations of the utility of this invention 10. Moreover, the user is provided an immediate sense of the orientation of the fish hook 30 when simply grasping the gripping portion 18 with a familiarity to its offset orientation benefits of rotational control with respect to the handle 12 and with respect to the selective benefits of rotational orientation of fish hook 30 with respect to the longitudinal axis L.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A buoyant hand held fishing gaff for manually engaging and lifting fish from water, comprising:

an elongated handle having a substantially straight main portion having a proximal end of said handle and a grasping or gripping portion arcuately extending away from a longitudinal axis of said straight portion and terminating at a distal end of said handle;

a fish engaging member having a substantially straight shank portion and an arcuately shaped hook portion terminating in a sharpened distal tip thereof;

said shank portion operably connected in substantially collinear alignment within, and extending from said proximal end, said shank portion being securely positionable in a plurality of different rotationally aligned positions whereby said hook portion is selectively positionably orientable about the longitudinal axis with respect to said grasping or gripping portion;

said handle being hollow—along substantially the entire length thereof—and of sufficient airtight interior air volume to render said fish gaff substantially buoyant in water.

2. A hand held fishing gaff for hooking and lifting fish from water comprising:

an elongated handle having a straight portion at one end and an offset hand grasping portion at another end of said handle;

said grasping portion extending divergently away from a longitudinal axis of said straight portion toward a distal end of said handle;

a generally u-shaped fish engaging member having a shank portion and a hook portion thereof, said hook portion terminating at a sharpened distal tip thereof, said shank portion supportively engaged generally coaxially into the end of said straight portion and being held therein in selected rotational positions about the longitudinal axis whereby said fish hook portion is selectively orientable into each of a plurality of positions with respect to said hand grasping portion;

a protective tip guard formed as a unit of resilient elastomeric or plastic material having a tip cover at one end thereof sized to snugly fit over the pointed distal tip of said hook portion and an enlarged tubular portion at another end of said tip guard snugly fitted over said shank portion for support, said tip cover and said tubular portion interconnected by an elongated resilient band.

3. A hand held fishing gaff for hooking and lifting fish from water comprising:

an elongated handle having a straight portion and an arcuate gripping portion, said straight and gripping portions substantially lying in a plane;

said arcuate gripping portion having a uniform oval cross section over substantially the entire length thereof with a maximum width of said oval cross section lying in said plane, said oval cross section enhancing grippability and a sense of orientation of said handle when gripped;

a fish hook having a shank portion connected into a proximal end of said straight portion and being held for rotation and limited longitudinal movement about a longitudinal axis common to said straight portion and said shank;

said gripping portion extending away from the longitudinal axis toward a distal end of said handle;

a fish hook detent interconnected between said straight portion and said shank portion, said fish hook being selectively self-locking by said detent into one of a plurality of positional orientations about the longitudinal axis and with respect to said gripping portion.

4. A hand held fishing gaff as set forth in claim 1, wherein:

said handle is substantially filled with foam material to maintain air tightness and buoyancy of said handle in water.

5. A hand held fishing gaff as set forth in claim 1, further comprising:

a tubular foam covering formed of dosed cell foam material extending over said gripping portion for enhanced gripability and additional buoyancy of said fishing gaff.

* * * * *